United States Patent
Nakamura

(10) Patent No.: US 6,664,325 B1
(45) Date of Patent: Dec. 16, 2003

(54) FIBER PROCESSING AGENT, REINFORCING FIBER PROCESSED BY THE FIBER PROCESSING AGENT AND RUBBER PRODUCT REINFORCED BY THE REINFORCING FIBER

(75) Inventor: Kenichi Nakamura, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/889,363

(22) PCT Filed: Dec. 17, 1999

(86) PCT No.: PCT/US99/30077

§ 371 (c)(1), (2), (4) Date: Jul. 13, 2001

(87) PCT Pub. No.: WO00/42094

PCT Pub. Date: Jul. 20, 2000

(30) Foreign Application Priority Data

Jan. 14, 1999 (JP) ............................................ 11/007358

(51) Int. Cl.$^7$ .................................................. C08F 8/08
(52) U.S. Cl. ........................ 524/510; 525/109; 525/481; 8/115.6; 8/115.61; 428/365; 428/375; 428/395; 523/206
(58) Field of Search ................................. 525/109, 481; 8/115.61, 115.6; 428/365, 395, 375; 523/206; 524/510

(56) References Cited

U.S. PATENT DOCUMENTS

| 3,806,489 A | 4/1974 | Rieux et al. |
| 3,864,203 A | * 2/1975 | Marzocchi |
| 4,131,584 A | * 12/1978 | Burke, Jr. et al. |
| 4,547,533 A | 10/1985 | Zabrocki et al. |
| 4,643,938 A | * 2/1987 | Oyama et al. |
| 4,891,267 A | 1/1990 | Takahashi et al. |

FOREIGN PATENT DOCUMENTS

| JP | 1-221433 A | 9/1989 |
| JP | 5-71710 B2 | 10/1993 |
| JP | 6-25978 A | 2/1994 |
| JP | 10-204780 A | 8/1998 |

OTHER PUBLICATIONS

Abstract JP 68–017505, 1968.*
Patent Abstracts of Japan; vol. 1999, No. 5, May 31, 1999 & JP 11–035702 (Yokohama Rubber Co. Ltd.).
Patent Abstracts of Japan; vol. 014, No. 096, Feb. 22, 1990 & JP 01–304168 (Bando Chem. Ind. Ltd.).

* cited by examiner

*Primary Examiner*—Margaret G. Moore
(74) *Attorney, Agent, or Firm*—Frishauf, Holtz, Goodman & Chick, P.C.

(57) ABSTRACT

A reinforcing fiber is provided, which can exhibit sufficient adhesive strength even with single layer film coating, a fiber processing agent which can enhance the strength of adhesion between the fiber and the matrix, and a rubber product employing the reinforcing fiber. The fiber processing agent contains a rubber modified epoxy resin. The rubber modified epoxy resin is obtained by epoxidating a high molecular compound having rubber elasticity, and therefore possesses both high elasticity peculiar to rubber and high adhesive strength due to the epoxidation. The high molecular compound having rubber elasticity includes a butadiene-styrene copolymer latex, and an acrylonitrile-styrene copolymer latex, for example. This epoxidized rubber latex is combined with an emulsified phenol resin.

18 Claims, No Drawings

FIBER PROCESSING AGENT, REINFORCING FIBER PROCESSED BY THE FIBER PROCESSING AGENT AND RUBBER PRODUCT REINFORCED BY THE REINFORCING FIBER

This application is a U.S. National Phase Application under 35 USC 371 of International Application PCT/US99/30077 (published in English) filed Dec. 17, 1999.

TECHNICAL FIELD

The present invention relates to a reinforcing fiber embedded in rubber or resin to enhance the strength and dimensional stability of the same, and also relates to a fiber processing agent for use in a reinforcing fiber of this kind and a rubber product reinforced by the reinforcing fiber.

BACKGROUND ART

Rubber products and resin products in general have glass fibers or organic fibers embedded therein to enhance the dimensional stability and strength thereof. Glass fibers of this kind have a low affinity to rubber and resin which are organic substances, and therefore have their surfaces coated with films of isocyanate, a halogen-containing polymer, or the like. For example, a glass fiber for reinforcing rubber matrices is disclosed in Japanese Patent Publication (Kokoku) No. 5-71710, which is coated with a three-layer film having a first layer containing a water soluble condensate of resorcinol formaldehyde (hereinafter referred to as "RFL") and rubber, a second layer containing a halogen-containing polymer and isocyanate, and a third layer formed of rubber which is the same as the rubber matrix. Further, a glass fiber is disclosed in Japanese Laid-Open Patent Publication (Kokai) No. 1-221433, which is coated with a film containing RFL, butadiene-styrene-vinylpyridine-terpolymer, and chlorosulfonated polyethylene.

These films exhibit intermediate properties between those of the glass fiber and those of the rubber matrix or the resin matrix (hereinafter abbreviated as "the matrix") and have an affinity to both of them to enhance their adhesive strength.

On the other hand, organic fibers have a higher affinity to the matrix compared with glass fibers. However, they still do not have satisfactorily sufficient adhesive strength. To further enhance the adhesive strength, an organic fiber to be used is coated with a film similar to those coated over the glass fibers. For example, Japanese Laid-Open Patent Publication (Kokai) No. 6-25978 discloses an aromatic polyamide-reinforcing fiber which is coated with a two-layer film having a first layer containing a polyepoxide compound having two or more epoxy radicals, and a second layer containing RFL. Further, Japanese Laid-Open Patent Publication (Kokai) No. 10-204780 discloses a polyester fiber which is coated with polyvinyl formaldehyde, aromatic epoxide compound, blocked polyisocyanate compound, and RFL.

The prior art, however, has the following problems:

The above-indicated glass fiber coated with the three-layer film has high adhesive strength since the glass fiber progressively changes in nature or property from the glass fiber to the rubber matrix, so that the glass fiber exhibits high adhesive strength. However, it has a problem of a complicated manufacturing process. On the other hand, the glass fiber coated with the single layer film and the organic fibers as indicated above can be manufactured by simple manufacturing processes, but they cannot be considered to have sufficient strength of adhesion to the matrix.

Besides, it is difficult for the glass fibers and the organic fibers to use a common fiber processing agent due to their different materials. Therefore, respective different exclusive fiber processing agents have been used for the glass fibers and the organic fibers.

The present invention has been devised in order to solve the above problems with the prior art, and it is an object of the invention to provide a reinforcing fiber which can exhibit sufficient adhesive strength even with single layer film coating, a fiber processing agent which can enhance the strength of adhesion between the fiber and the matrix, and a rubber product employing the reinforcing fiber.

DISCLOSURE OF THE INVENTION

To attain the above object, according to a first aspect of the present invention, there is provided a fiber processing agent comprising a rubber modified epoxy resin obtained by epoxidating an acrylonitrile-butadiene copolymer latex.

To attain the above object, according to a second aspect of the present invention, there is provided a fiber processing agent comprising a rubber modified epoxy resin, and a phenol resin.

Preferably, in the fiber processing agent according to the second aspect, the rubber modified epoxy resin and the phenol resin each have a solids content thereof falling within a range of 10 to 90 weight % relative to a total solids content of the fiber processing agent.

More preferably, the rubber modified epoxy resin and the phenol resin are each in an emulsified state.

Preferably, the rubber modified epoxy resin of the fiber processing agent of the second aspect is obtained by epoxidating a butadiene-styrene copolymer latex or an acrylonitrile-butadiene copolymer latex.

Also preferably, in the fiber processing agent according to the first or second aspect, the concentration of the total solids is 10 to 50 weight %.

To attain the above object, according to a third aspect of the present invention, there is provided a reinforcing fiber which has been processed by the fiber processing agent according to the first or second aspect of the invention.

Preferably, the reinforcing fiber according to the present invention comprises a glass fiber or an aramid fiber processed by the fiber processing agent.

More preferably, in the reinforcing fiber according to the present invention, an amount of solids of the fiber processing agent deposited on the fiber is 10 to 30 weight % relative to the weight of the reinforcing fiber.

To attain the above object, according to a fourth aspect of the present invention, there is provided a rubber product which has the reinforcing fiber according to the present invention embedded therein.

Preferably, the rubber product according to the present invention contains the reinforcing fiber in an amount of 10 to 70 weight %.

More preferably, the rubber product according to the present invention comprises a reinforcing fiber including an aramid fiber, and a single-layer film coated over the aramid fiber, and a rubber matrix having the reinforcing fiber embedded therein, and the strength of adhesion between the aramid fiber, the single-layer film, and the rubber matrix is at least 200 kgf/25 mm in width.

BEST MODE FOR CARRYING OUT THE INVENTION

An embodiment of the present invention will now be described in detail.

The present invention provides a fiber processing agent which comprises rubber modified epoxy resin. The rubber modified epoxy resin is obtained by epoxidating a high molecular compound having high rubber elasticity which possesses both high elasticity peculiar to rubber, and high adhesive strength due to the epoxidation. The high molecular compound having high rubber elasticity may include a butadiene-styrene copolymer latex, an acrylonitrile-butadiene copolymer latex, a butadiene rubber latex, and an isoprene rubber latex, for example.

These high molecular compounds having a hydroxyl group or an epoxy group as a side chain thereof when epoxidated. The hydroxyl group or epoxy group (hereinafter simply referred to as "the epoxy group") is a polar group and easily chemically reacts so that it coacts with peripheral substance(s) to enhance the strength of adhesion between high molecular compounds in the film and also enhance the strength of adhesion between the film and the fiber or the matrix. Therefore, a rubber product and a resin product in which is embedded a reinforcing fiber processed by the fiber processing agent according to the invention (hereinafter simply referred to as "the product") has high solidity as well as high durability and strength.

These rubber modified epoxy resins may be each used singly or may be used in the form of a mixture of two or more of them. In many cases, it is preferable that two or more of the rubber modified epoxy resins should be used in the form of a mixture, though it depends upon the compatibility between the fiber and the matrix. The reason for this is considered to be that the film is required to be intermediate in property between the fiber and the matrix. If a mixture of two or more of the rubber modified epoxy resins is used, the respective rubber properties of the two or more resins can be reflected in the film. For example, if the fiber is a metallic fiber, which is largely different in property from the matrix, such a mixture should be used that ingredient(s) is(are) are contained in the film that are compatible with both the metallic fiber and the matrix.

As described above, the rubber modified epoxy resin is obtained by epoxidating one or more of the above-mentioned high molecular compounds. Among the above-mentioned high molecular compounds, the butadiene-styrene copolymer latex and the λ.acrylonitrile-styrena] acrylonitrile-butadiene copolymer latex are particularly preferable for use as the rubber modified epoxy resin through epoxidation thereof. The butadiene-styrene copolymer latex and the [acrylonitrile-styrena] acrylonitrile-butadiene copolymer latex are characterized by their high flexibility due to their amorphous structures. Therefore, the resulting rubber modified epoxy resin can fully exhibit its function of flexibility when used in a reinforcing fiber required to have flexibility or resistance to bending, such as a timing belt of an engine and a belt of a belt conveyor.

An example of the rubber modified epoxy resin obtained from the butadiene-styrene copolymer latex is available under a model "Yuka Resin KE172" from Yoshimura Oil Chemical Co., Ltd. An example of the rubber modified epoxy resin obtained from the [acyrlonitrile-styrena] acrylonitrile-butadiene copolymer latex is available under a model "Yuka Resin KE173" from Yoshimura Oil Chemical Co., Ltd. These epoxy resins are in the form of emulsions so that conveniently they can be easily evenly dispersed in the fiber processing agent.

The fiber processing agent may contain other ingredient (s) than the rubber modified epoxy resin, together with the latter, such as a non-epoxidated rubber or resin, an emulsifier, a surface active agent, a blocking agent, a stabilizer, and an antioxidant.

The non-epoxidated rubber may include the butadiene-styrene copolymer latex, the [acrylonitrile-styrena] /acrylonitrile-butadiene copolymer latex, the chlorosulfonated polyethylene latex, and a carbonyl modified butadiene-styrene copolymer latex. The non-epoxidated resin may include a phenol resin, an acrylic resin, a polyurethane resin, and a polyester resin. When one or more of these ingredients are contained in the fiber processing agent, the resulting film may have different properties from those of the rubber modified epoxy resin.

Among the above other ingredients, it is preferable that the fiber processing agent should contain a phenol resin. A phenol resin suitable for the present invention is obtained by an addition polycondensation reaction between phenol and formaldehyde, and can be formed into a resol type or a novolak type depending upon the reaction conditions. Either only one of the two types may be used singly or both of them may be used in the form of a mixture. The phenol resin is prone to assume a three-dimensional structure due to the polymerization reaction, and therefore acts to enhance the strength of the film. Further, the phenol resin can react with the rubber modified epoxy resin as well during its polymerization process, and therefore can act to enhance the solidity of the film.

Phenol resins of this kind are available from Yoshimura Oil Chemical Co., Ltd. under models Yuka Resin KE910, Yuka Resin KE911, and Yuka Resin KE912. These phenol resins are in the form of emulsions.

The emulsifier may include polyethylene nonyl ether, polyoxyethylene nonyl phenyl ether, and polymethylene phenyl siloxane. These emulsifiers act to promote emulsification of ingredients of the fiber processing agent and hence effectively act to evenly disperse the ingredients. Further, they act to enhance the smoothness of the processed fiber.

The fiber processing agent is generally used in the state of a solution in view of its easiness to handle and apply to fibers, whereas storage and transportation are more convenient to carry out when the fiber processing agent is in a solid state with the solvent evaporated off.

The method of manufacturing the fiber processing agent may usually include a method of mixing ingredients into water or an organic solvent, and agitating the water or organic solution by an agitator so as for the ingredients to be evenly dispersed by an agitator, though the manufacturing method is not particularly limited to this method. The organic solvent may preferably be an alcoholic solvent such as methyl alcohol and ethyl alcohol, in view of their hydrophilic property, easiness to remove the solvent during film formation, etc.

If the fiber processing agent is composed of a plurality of ingredients, it is preferable to previously emulsify the ingredients before mixing them. By separately emulsifying the ingredients, a polymerization reaction in the fiber processing agent can be suppressed. If the polymerization reaction occurs, the viscosity of the fiber processing agent increases such that a film cannot be evenly or uniformly formed, resulting in variations in the performance of the reinforcing fiber processed by the fiber processing agent.

Fibers that can be applied to the present invention may include glass fiber, polyester fiber, polyamide fiber such as nylon and aramid, and carbon fiber, though they are not limitative. Among these fibers, glass fiber and aramid fiber are particularly effective to greatly enhance the strength of adhesion with the rubber matrix. The reason for this is not clear, but it is considered to be that the high rubber elasticity of the rubber modified epoxy resin and the increased adhesive strength due to the epoxidation effectively function.

The glass fiber may include E glass, and high-strength glass, for example, though they are not limitative. The filament diameter of the glass fiber is not limitative, but glass fibers having a filament diameter of 5 to 13 $\mu$m may be suitably be used. As to the aramid fiber, fibers having 400 to 5,000 deniers are easily available and preferable.

The glass fiber that can be applied to the present invention is a glass fiber composed of several hundreds of glass filaments bound together by a binder. The binder may preferably contain a silane coupling agent or the like to reform the surfaces of the glass filaments so as to enhance the affinity between the glass filaments and organic substance(s). The polyamide fiber may advantageously have its surface subjected to epoxy treatment or polyisocyanate treatment to enhance the strength of adhesion with the film.

The form of these fibers is not limitative, and may include staple, filament, cord, rope, and canvas or duck, for example. The form of the reinforcing fiber is determined by the shape and application of a product to be manufactured. The reinforcing fiber according to the present invention can exhibit sufficient strength of adhesion with the matrix irrespective of its form.

The content of each of the rubber modified epoxy resin and the phenol resin in the fiber processing agent should preferably be 10 to 90 weight % in terms of solids content relative to the total solids content of the fiber processing agent. If the solids content of the rubber modified epoxy resin is less than 10 weight %, the intended effect of enhancement of the adhesive strength by the epoxy group cannot be achieved to a satisfactory extent, whereas, if the solids content exceeds 90 weight %, the properties of the other ingredients cannot be exhibited to a satisfactory extent. The preferable content of the rubber modified epoxy resin is 40 to 70 weight %. On the other hand, if the content of the phenol resin is less than 10 weight %, the intended effect of enhancement of the strength of the film by the phenol resin cannot be achieved to a sufficient extent, whereas, if the content exceeds 90 weight %, the properties of the other ingredients cannot be exhibited to a satisfactory extent. The preferable content of the phenol resin is 30 to 60 weight %.

In the case of a two-ingredient containing fiber processing agent containing both the rubber modified epoxy resin and the phenol resin, the contents of the two ingredients should preferably be equal to each other. Practically, the content of each ingredient should preferably be 40 to 60 weight %. The reason for this is not clear, but it is considered to be that the two effects of enhancement of the adhesive strength of the film and enhancement of the strength of the same are in balance.

The suitable concentration of the fiber processing agent is 10 to 50 weight % in terms of the sum of the solids contents of all the ingredients, and more preferably 12 to 30 weight %. If the solids concentration is less than 10 weight %, the viscosity of the fiber processing agent is so low that the fiber processing agent cannot easily adhere to the fiber surface in a short time, whereas, if the solids concentration exceeds 50 weight %, the viscosity is so high that the amount of the fiber processing agent adhering to the fiber cannot be easily adjusted, and further a film cannot be easily evenly or uniformly formed.

The method of applying the fiber processing agent to the fiber surface is not limitative and may be directly implemented by prior art methods. More specifically, one of the prior art methods is a so-called dipping method which causes the fiber to be continuously passed from one of two baths filled with the fiber processing agent to the other bath such that the fiber is dipped in the bath that it is passing. In moving the fiber out of the bath, an excess portion of the fiber processing agent is removed, and if required, the fiber is heat treated at 200 to 300° C. for 0.5 to 3 minutes. The fiber processing agent attached to the fiber surface forms a film on the fiber surface due to splashing of the solvent and a polymerization reaction of the ingredients.

The weight of the film, i.e. the amount of the fiber processing agent deposited or attached to the fiber surface (hereinafter referred to as "the deposit amount") should preferably be 10 to 30 weight % in terms of solids content relative to the weight of the reinforcing fiber. If the deposit amount is less than 10 weight %, the film cannot be uniformly formed, and the formed film is so thin that the property of flexibility of the rubber modified epoxy resin cannot be effectively achieved. On the other hand, if the deposit amount exceeds 30 weight %, the film cannot be formed in a short time, and further the fiber processing agent can hang down before the film becomes hardened, resulting in uneven formation of the film.

According to the present invention, rubber and resin can be employed as the matrix, as mentioned before. If rubber is employed, the intended effects of the present invention can be exhibited most effectively. That is, rubber products are frequently used for such applications as utilize high flexibility inherent in rubber, and accordingly reinforcing fibers for such rubber products are necessarily required to have flexibility or resistance to bending. Therefore, the feature of flexibility of the rubber modified epoxy resin according to the present invention will then effectively function.

The kind of the rubber matrix that can be applied to the present invention is not limitative, and the matrix rubber may include chloroprene rubber, chlorosulfonated polyethylene rubber, acrylonitrile-butadiene copolymer rubber, acrylonitrile partial hydride-butadiene copolymer rubber, and nitril group-containing highly saturated copolymer rubber, for example. A vulcanizer, a rubber accelerator, a pigment, a fat and oil, and a stabilizer may be added to the above rubber matrices in predetermined ratios according to their respective applications.

The weight percent of the reinforcing fiber in the rubber product is preferably 10 to 70 weight %, and more preferably 15 to 40 weight %. If the weight percent is less than 10 weight %, the intended effect of enhancement of the strength of the rubber product cannot be achieved to a satisfactory extent, whereas, if the weight percent exceeds 70 weight %, the properties of the reinforcing fiber surpass those of the rubber matrix such that the elasticity of the rubber product can be suppressed.

The method of embedding the reinforcing fiber in the rubber matrix is not limitative, and may include the following method, for example: That is, a method of arranging several filaments of the reinforcing fiber in lines, twisting them together, embedding the filaments twisted together in the rubber matrix before vulcanization in a known manner, and heating the rubber matrix with the filaments embedded therein under pressure at a temperature of 120 to 220° C. for 1 to 120 minutes, for vulcanization.

Further, the present invention has another feature that the aramid fiber and the rubber matrix show sufficient strength of adhesion therebetween even if the film has a single layer. Although it has conventionally been known to form a single layer film alone on a fiber and embed the film-formed fiber in a matrix, the adhesive strength according to this conventional method was not sufficient. For example, when a rubber product manufactured by the conventional method is tested by a tensile strength test, the resulting rubber product frequently undergoes separation of the film coated portion from the fiber or the matrix. That is, the adhesive strength of the film was not as high as the strength of the fiber. This tendency of low adhesive strength is particularly conspicuous when the aramid fiber is employed, failing to fully exhibit the intrinsic strength of the aramid fiber. Therefore, conventionally, two or three layers of film were formed on the aramid fiber to enhance the strength. However, according to this conventional method forming a multi-layer film, the manufacturing process is complicated and hence disadvantageous in respect of the manufacturing cost. The reinforcing fiber according to the present invention can exhibit sufficient strength of adhesion with the aramid fiber and the rubber matrix even if the film has a single layer. However, the present invention does not preclude formation of a two or more layer film.

The adhesive strength as used in the present invention means initial adhesive strength as shown in examples given below ("Adhesive Property 1" in Tables 4 and 5). It is a peculiar feature of the present invention that the adhesive strength is 200 kgf/25 mm in width or more in the case where the aramid fiber formed with a single layer film is embedded in the rubber matrix.

EXAMPLES

The present invention will be further described in detail hereinbelow with reference to examples according to the present invention and comparative examples.

Manufacture of Fiber Processing Agent

Fiber processing agents were separately prepared in predetermined manners according to compositions shown in Tables 1 and 2 given below, to obtain Examples Nos. 1 to 10 and Comparative examples Nos. 1 to 3. The solids concentration of each fiber processing agent was adjusted so as to fall within a range of 20 to 25 weight %.

TABLE 1

| COMPONENTS | EXAMPLES ACCORDING TO PRESENT INVENTION | | | | | | | COMPARATIVE EXAMPLES | |
|---|---|---|---|---|---|---|---|---|---|
| | 1 | 2 | 3 | 4 | 5 | 6 | 7 | 1 | 2 |
| YUKA RESIN KE912 | 40 | 40 | 22 | 22 | 13 | 13 | 9 | | 22 |
| YUKA RESIN KE910 | | | | | 9 | 9 | | | |
| YUKA RESIN KE172 | 9 | | 22 | | | 9 | | | |
| YUKA RESIN KE173 | | 8 | | 22 | 22 | 13 | 33 | | |
| RF LIQUID | | | | | | | | 35 | |
| ZETPOL LATEX | | | | | | | | 50 | 50 |
| 25% AQUEOUS AMMONIA | | | | | | | | 1 | |
| WATER | 51 | 52 | 56 | 56 | 56 | 56 | 58 | 14 | 28 |

UNIT: WEIGHT %
Yuka Resin KE912: Phenol Resin Emulsion (Yoshimura Oil Chemical Co., Ltd., Solids Content: 50%)
Yuka Resin KE910: Phenol Resin Emulsion (Yoshimura Oil Chemical Co., Ltd., Solids Content: 55%)
Yuka Resin KE172: Butadiene-Styrene Copolymer Modified Epoxy Resin Emulsion (Yoshimura Oil Chemical Co., Ltd., Solids Content: 55%)
Yuka Resin KE173: Acrylonitrile-Butadiene Copolymer Modified Epoxy Resin Emulsion (Yoshimura Oil Chemical Co., Ltd., Solids Content: 60%)
Zetpol Latex: Nitril Group-Containing Highly Saturated Copolymer Rubber Latex (Nippon Zeon Co., Ltd.: Solids Content: 40%)
RF Liquid: Adjusted according to a blending ratio shown in Table 2

TABLE 2

| COMPO-NENTS | EXAMPLES ACCORDING TO PRESENT INVENTION | | | COMPARATIVE EXAMPLE |
|---|---|---|---|---|
| | 8 | 9 | 10 | 3 |
| FIRST LAYER | EXAMPLE 2 | EXAMPLE 4 | EXAMPLE 7 | COMPARATIVE EXAMPLE 1 |
| SECOND LAYER | | | | |
| CSM LATEX | 35 | 35 | 35 | 35 |
| XYLENE | 65 | 65 | 65 | 65 |

UNIT: WEIGHT %
CSM Latex: Chlorosulfonated Polyethylene Rubber latex (Lord Corporation, Solids Content: 30%)

Manufacture of Reinforcing Fiber

Two pieces of an aramid fiber (Technora T202 1500D manufactured by Teijin Limited) were doubled, and the doubled fiber was subjected to primary twist 3.1 times per inch. Then, fiber processing agents according to Examples Nos. 1 to 7 according to the present invention and Comparative examples Nos. 1 and 2 shown in Table 1 given above were each applied to the twisted fiber such that the amount of solids deposited on the fiber surface was within a range of 10 to 15 weight %, followed by being subjected to a heat treatment at 250° C. for 90 seconds, to obtain reinforcing fibers. Further, fiber processing agents for second layer shown in Table 2 given above were applied to the reinforcing fibers according to Examples Nos. 2, 4 and 7 according to the present invention and Comparative example No. 1, followed by carrying out a heat treatment of the reinforcing fibers at 120° C. for 120 seconds, to obtain double-layered reinforcing fibers. The amount of deposited solids of the second layer in these reinforcing fibers was 50 to 10 weight %.

Manufacture of Rubber Matrix

A rubber matrix was manufactured in a predetermined manner according to a blending ratio shown in Table 3 given below. The mixture obtained by blending materials was in a fluid state having a viscosity of approximately 10 cps.

TABLE 3

| COMPONENTS | WEIGHT % |
|---|---|
| NITRILE RUBBER HYDRIDE | 100 |
| ZINC WHITE | 5 |
| STEARIC ACID | 1 |
| CARBON BLACK | 50 |
| TRIOCTYL TRIMELLITATE | 10 |
| SULFUR | 5 |
| TETRAMETHYLTHIURAM DISULFIDE | 1.5 |
| N-CYCLOHEXYL-2-BENZOTHIAZYL SULFENAMIDE | 1 |

Manufacture of Product

The rubber matrix in Table 3 given above was shaped into a sheet having a thickness of 3 mm and a width of 25 mm. On the resulting rubber sheet were arranged at equal intervals a predetermined number of pieces of each of the reinforcing fibers according to Examples Nos. 1 to 10 according to the present invention and Comparative examples Nos. 1 to 3, and then the rubber sheet with the reinforcing fiber arranged thereon was loaded into a mold, followed by being heated under pressure for a predetermined time period, to obtain a rubber matrix with the reinforcing fiber embedded therein.

Evaluation Method

Adhesive Strength: Adhesion Properties 1 and 2 The reinforcing fibers of Examples Nos. 1 to 10 according to the present invention and Comparative examples Nos. 1 to 3 were each arranged in 22 pieces at equal intervals on the above-mentioned rubber matrix sheet, followed by being vulcanized under a pressure of 80 kgf/cm$^2$, at a mold temperature of 150° C., for a vulcanization time of 20 minutes, to obtain a rubber product having a length of 15 cm and a width of 25 mm for testing purposes, for each of the examples according to the present invention and the comparative examples. The rubber product was pulled at a testing speed of 50 mm/min in a longitudinal direction thereof by a tensile tester AGS-500A Autograph manufactured by Shimadzu Inc., and strength upon rupture of the rubber product, i.e. initial adhesive strength was measured. The results of the tensile test are shown as Adhesive Property 1 in Tables 4 and 5 given below. In the above tensile test, ruptured portions of the rubber products for Examples Nos. 1 to 10 according to the present invention were observed to find that all the examples showed ruptures in the aramid fibers, but no separation from the film was found in any of the examples.

On the other hand, the rubber products were boiled in hot water for one hour, followed by conducting a tensile test similar to the above described tensile test. Results of the test are also shown in Tables 4 and 5 as Adhesive Property 2. The measured Adhesive Property 2 shows the water resistance of the rubber products, i.e. the durability of the same in actual use.

TABLE 4

|  | EXAMPLES ACCORDING TO PRESENT INVENTION | | | | | | | COMPARATIVE EXAMPLES | |
| --- | --- | --- | --- | --- | --- | --- | --- | --- | --- |
| ITEMS | 1 | 2 | 3 | 4 | 5 | 6 | 7 | 1 | 2 |
| ADHESIVE PROPERTY 1 | 212 | 210 | 254 | 252 | 206 | 231 | 227 | 140 | 166 |
| ADHESIVE PROPERTY 2 | 138 | 147 | 176 | 143 | 153 | 147 | 157 | 107 | 117 |

UNIT: kgf/25 mm IN WIDTH

TABLE 5

|  | EXAMPLES ACCORDING TO PRESENT INVENTION | | | COMPARATIVE EXAMPLES |
| --- | --- | --- | --- | --- |
| ITEMS | 8 | 9 | 10 | 3 |
| ADHESIVE PROPERTY 1 | 237 | 252 | 239 | 154 |
| ADHESIVE PROPERTY 2 | 167 | 196 | 176 | 127 |

UNIT: kgf/25 mm IN WIDTH

The test results of the examples according to the present invention and the comparative examples show the following facts:

A comparison between Examples Nos. 1 to 10 according to the present invention and Comparative examples Nos, 1 to 3 will show that if the rubber modified epoxy resin is contained in the fiber processing agent, the adhesive properties 1 and 2 are greatly improved. That is, the rubber modified epoxy resin enhances the strength and water resistance of the rubber product.

A comparison between Examples Nos. 1 to 7 according to the present invention and Comparative examples Nos. 1 to 3 will show that if the film contains the rubber modified epoxy resin, the initial adhesive strength is improved by 30% or more. Further, Comparative example No. 3 showed an initial adhesive strength of 50 kgf/25 mm in width though it has a double-layer film, which shows that the effect of addition of the rubber modified epoxy resin is large.

The results of the initial adhesive strength test showed no separation from the film on the ruptured surface of the rubber product in Examples Nos. 1 to 10 according to the present invention. This tells that the fiber processing agent containing the rubber modified epoxy resin has sufficient strength of adhesion with the aramid fiber and the rubber matrix, thus enabling the aramid fiber to fully exhibit its intrinsic strength.

The results of Examples Nos. 1 to 10 according to the present invention show that as the content of the rubber modified epoxy resin and that of the phenol resin are closer to each other, the initial adhesive strength becomes higher.

Industrial Application

The present invention constructed as described above provides the following effects:

Since the fiber processing agent according to the first aspect of the present invention comprises a rubber modified epoxy resin, the strength of adhesion between high molecular compounds can be enhanced, and further the strength of adhesion between the film and the fiber and the matrix can be enhanced.

Since the fiber processing agent according to the second aspect of the present invention comprises a rubber modified epoxy resin, and a phenol resin, the respective rubber properties of the resins can be reflected in the film. Further, the addition of the phenol resin can enhance the strength and solidity of the film.

Since in the fiber processing agent according to the second aspect, the rubber modified epoxy resin and the phenol resin each have a solids content thereof falling within a range of 10 to 90 weight % relative to a total solids content of the fiber processing agent, the respective properties of the ingredients can be effectively exhibited.

Since in the fiber processing agent according to the second aspect, the rubber modified epoxy resin and the phenol resin are each in an emulsified state, a polymerization reaction in the fiber processing agent can be suppressed.

Since the rubber modified epoxy resin of the fiber processing agent of the first or second aspect is obtained by epoxidating a butadiene-styrene copolymer latex or an [acrylonitrile-styrena] acrylonitrile-butadiene copolymer latex, a film having high flexibility can be formed.

Further, since in the fiber processing agent according to the first or second aspect, the concentration of th total solids is 10 to 50 weight %, a film can be evenly or uniformly formed over the fiber.

Since the reinforcing fiber according to the third aspect of the invention has been processed by the fiber processing agent according to the first or second aspect of the invention, a reinforcing fiber which can significantly enhance the strength of the resulting rubber product can be easily provided.

Since the reinforcing fiber according to the present invention comprises a glass fiber or an aramid fiber processed by the fiber processing agent, the strength of adhesion between the fiber and the film can be more significantly enhanced.

Further, since in the reinforcing fiber according to the present invention, the amount of solids of the fiber processing agent deposited on the fiber is 10 to 30 weight % relative to the weight of the reinforcing fiber, the effect of enhancement of the adhesive strength by the film can be exhibited effectively and efficiently.

Since the rubber product according to the fourth aspect of the present invention has the reinforcing fiber according to the present invention embedded therein, a rubber product having high solidity and high strength can be easily provided.

Further, since the rubber product according to the present invention contains the reinforcing fiber in an amount of 10 to 70 weight %, sufficient elasticity of the rubber matrix and sufficient strength of the reinforcing fiber can be exhibited in a well-balanced manner.

Furthermore, since the rubber product according to the present invention comprises a reinforcing fiber including an aramid fiber, and a single-layer film coated over the aramid fiber, and a rubber matrix having the reinforcing fiber embedded therein, and the strength of adhesion between the aramid fiber, the single-layer film, and the rubber matrix is at least 200 kgf/25 mm width, a rubber product having very high adhesive strength can be easily provided.

What is claimed is:

1. A fiber treatment agent comprising a rubber modified epoxy resin obtained by expoxidating an acrylonitrile-butadiene copolymer latex and a phenol resin, each of said rubber modified epoxy resin and said phenol resin being in an emulsified state.

2. A fiber treatment agent as claimed in claim 1, wherein said rubber modified epoxy resin obtained by epoxidating an acrylonitrile-butadiene copolymer latex, and said phenol resin each have a solids content thereof falling within a range of 10 to 90 weight % relative to a total solids content of the fiber treatment agent.

3. A fiber treatment agent as claimed in claim 1 or 2, containing total solids in a concentration of 10 to 50 weight %.

4. A fiber treatment agent as claimed in claim 1, containing total solids in a concentration of 10 to 50 weight %.

5. A fiber treatment agent as claimed in claim 1, wherein said rubber modified epoxy resin and said phenol resin are each contained in an amount of 40 to 60 weight %.

6. A reinforcing fiber which has been processed by the fiber treatment agent as claimed in claim 1 or 2.

7. A reinforcing fiber as claimed in claim 6, comprising a glass fiber processed by the fiber treatment agent.

8. A reinforcing fiber as claimed in claim 6, comprising an aramid fiber processed by the fiber treatment agent.

9. A reinforcing fiber as claimed in claim 6, wherein the fiber treatment agent has solids thereof deposited on the reinforcing fiber in an amount of 10 to 30 weight % relative to a weight of the reinforcing fiber.

10. A rubber product which has embedded therein the reinforcing fiber as claimed in claim 6.

11. A rubber product which has embedded therein the reinforcing fiber as claimed in claim 7.

12. A rubber product which has embedded therein the reinforcing fiber as claimed in claim 8.

13. A rubber product which has embedded therein the reinforcing fiber as claimed in claim 9.

14. A rubber product as claimed in claim 10, containing the reinforcing fiber in an amount of 10 to 70 weight %.

15. A rubber product as claimed in claim 11, containing the reinforcing fiber in an amount of 10 to 70 weight %.

16. A rubber product as claimed in claim 12, containing the reinforcing fiber in an amount of 10 to 70 weight %.

17. A rubber product as claimed in claim 13, containing the reinforcing fiber in an amount of 10 to 70 weight %.

18. A rubber product comprising a reinforcing fiber including an aramid fiber, and a single-layer film coated over said aramid fiber, and a rubber matrix having said reinforcing fiber embedded therein, and wherein strength of adhesion between said aramid fiber, said single-layer film, and said rubber matrix is at least 200 kgf/25 mm in width.

* * * * *